(12) United States Patent
O'Hara

(10) Patent No.: US 11,444,966 B2
(45) Date of Patent: Sep. 13, 2022

(54) AUTOMATIC DETECTION OF NETWORK STRAIN USING RESPONSE TIME METRICS

(71) Applicant: Arbor Networks, Inc., Westford, MA (US)

(72) Inventor: Sean O'Hara, Ypsilanti, MI (US)

(73) Assignee: Arbor Networks, Inc., Westford, MA (US)

( * ) Notice: Subject to any disclaimer, the term of this patent is extended or adjusted under 35 U.S.C. 154(b) by 463 days.

(21) Appl. No.: 16/717,783

(22) Filed: Dec. 17, 2019

(65) Prior Publication Data

US 2021/0185069 A1   Jun. 17, 2021

(51) Int. Cl.
| | | |
|---|---|---|
| H04L 29/06 | (2006.01) | |
| H04L 9/40 | (2022.01) | |
| H04L 69/22 | (2022.01) | |
| G06N 20/00 | (2019.01) | |
| H04L 43/045 | (2022.01) | |
| H04L 41/14 | (2022.01) | |

(52) U.S. Cl.
CPC ......... *H04L 63/1425* (2013.01); *G06N 20/00* (2019.01); *H04L 41/14* (2013.01); *H04L 43/045* (2013.01); *H04L 63/1441* (2013.01); *H04L 69/22* (2013.01)

(58) Field of Classification Search
CPC ... H04L 63/1425; H04L 41/14; H04L 43/045; H04L 63/1441; H04L 69/22; H04L 41/142; H04L 43/0864; H04L 43/062; H04L 63/1458; H04L 67/563; H04L 43/16; H04L 41/145; G06N 20/00
USPC .......................................................... 726/23
See application file for complete search history.

(56) References Cited

U.S. PATENT DOCUMENTS

| | | | | |
|---|---|---|---|---|
| 2002/0065938 A1* | 5/2002 | Jungck | ..................... | H04L 47/19 709/246 |
| 2004/0008726 A1* | 1/2004 | Kelly | ...................... | H04L 47/70 370/468 |
| 2019/0281009 A1* | 9/2019 | Abley | ................... | H04L 63/126 |

* cited by examiner

*Primary Examiner* — Tu T Nguyen
(74) *Attorney, Agent, or Firm* — Locke Lord LLP; Scott D. Wofsy; Christopher J. Capelli

(57) ABSTRACT

The method and system are provided for monitoring a protected network for strain. The method includes receiving a learned model having clusters of learning requests of learning network traffic observed during non-strain operation of the protected network, observing network traffic, classifying each of the traffic requests with one of the clusters based on fields of the traffic request and fields used for clustering the learning requests, determining an analysis response time for respective traffic requests associated with the classified traffic requests, determining an analysis response time characteristic per cluster based on an analysis response time associated with the respective classified traffic requests classified with the cluster, determining a difference per cluster between the analysis response time and the learning response times associated with the cluster, and notifying a mitigation device when the difference determined for enough of the clusters exceeds a predetermined threshold.

20 Claims, 4 Drawing Sheets

AUTOMATIC DETECTION OF NETWORK STRAIN USING RESPONSE TIME METRICS

FIELD OF THE INVENTION

The present technology relates to detection of strain in a protected network, and more particularly to automatic detection of strain in a protected network using response time metrics.

BACKGROUND

Overview

Strain on a network can occur when traffic volume to or from a network is larger than a capacity of the network. Strain can be caused, for example, by distributed denial of service (DDOS) attacks, a malfunctioning component in the network, and/or a spike in network traffic volume due to high utilization of the network in a short period of time. Defensive techniques for distributed denial of service (DDOS) attacks typically use deep packet inspection (DPI) to analyze and classify traffic and then blackhole or block illegitimate traffic. This is done with the expectation that removing attack traffic from the network allows for services to remain intact. The increasing sophistication of application layer attacks using well-formed requests challenges this expectation and ultimately leads to the dropping of legitimate traffic. Additionally, the DDOS attack itself or the response to the DDOS attack could result in the service becoming unable to provide online service.

Such conventional methods and systems have generally been considered satisfactory for their intended purpose. However, there is still a need in the art for a method to mitigate strain, such as from DDOS attacks that use well-formed requests, network component malfunction, or spikes in network traffic volume, while minimizing blockage of legitimate traffic and allowing the service to continue to provide at least some operations online.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a method of monitoring a protected network for strain. The method includes, during an analysis phase during operation of the protected network, receiving a learned model having clusters of learning requests of learning network traffic observed during non-strain operation of the protected network. Each cluster has an associated characteristic learning response time based on learning response times determined for learning requests and corresponding learning responses of the learning network traffic.

During the analysis phase, the method further includes observing network traffic having traffic requests and traffic responses to and from the protected network, classifying each of the traffic requests with one of the clusters by comparing fields of the traffic request to fields used for clustering the learning requests with the clusters, and associating one of the traffic responses or lack of traffic response to each corresponding traffic request of the clusters.

During the analysis phase, the method further includes determining an analysis response time for the respective traffic responses, associating the analysis response time with the respective classified traffic requests that correspond to the traffic responses, determining an analysis response time characteristic per cluster based on the analysis response time associated with the respective classified traffic requests classified with the cluster, determining a difference per cluster between the analysis response time and the learning response time associated with the cluster, and notifying a mitigation device when the difference determined for enough of the clusters exceeds a predetermined threshold.

In one or more embodiments, the method further includes, in a learning phase during non-strain operation of the protected network, observing the learning network traffic, clustering the learning requests based on the respective learning requests' fields, associating one of the learning responses or lack of learning response to each corresponding learning request of the clusters, determining the learning response time for the respective learning responses, and determining the characteristic learning response time per cluster based on the learning response times of the learning responses that correspond to the learning requests associated with the cluster.

In one or more embodiments, the method further includes normalizing selected fields of each learning request before clustering the learning requests using the normalized selected fields.

In one or more embodiments, the method further includes determining a maximum return time, wherein the selected fields of the learning requests and traffic requests are normalized using the maximum return time.

In one or more embodiments, the method further includes normalizing the selected fields of each traffic request, wherein normalizing the selected fields of the traffic requests is performed before classifying the traffic requests.

In one or more embodiments, the method further includes buffering the observed learning requests for a time interval before clustering the learning requests that were buffered for the time interval.

In one or more embodiments, the method further includes buffering the observed traffic requests for a time interval before classifying the traffic requests that were buffered for the time interval.

In one or more embodiments, for each traffic request that does not have a paired traffic response, the method further includes generating a timed-out response with an assigned learned response time and associating the timed-out response to the traffic response, wherein the assigned learned response time is larger than a predetermined acceptable response time window between receiving a traffic request and a corresponding traffic response.

In one or more embodiments, the method further includes generating a learned histogram per cluster that represents behavior of the cluster with regard to learning response times over time.

In one or more embodiments, the method further includes generating an analysis histogram per cluster that represents behavior of response times associated with traffic responses that correspond to traffic requests classified with the cluster over a window of time, wherein determining the difference per cluster includes comparing the learned histogram and the analysis histogram associated with the respective clusters.

In accordance with another aspect of the disclosure, a network monitoring system is provided to monitor a protected network. The system includes a memory configured to store instructions and a processor disposed in communication with the memory. The processor upon execution of the instructions is configured to perform the operations of the method.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
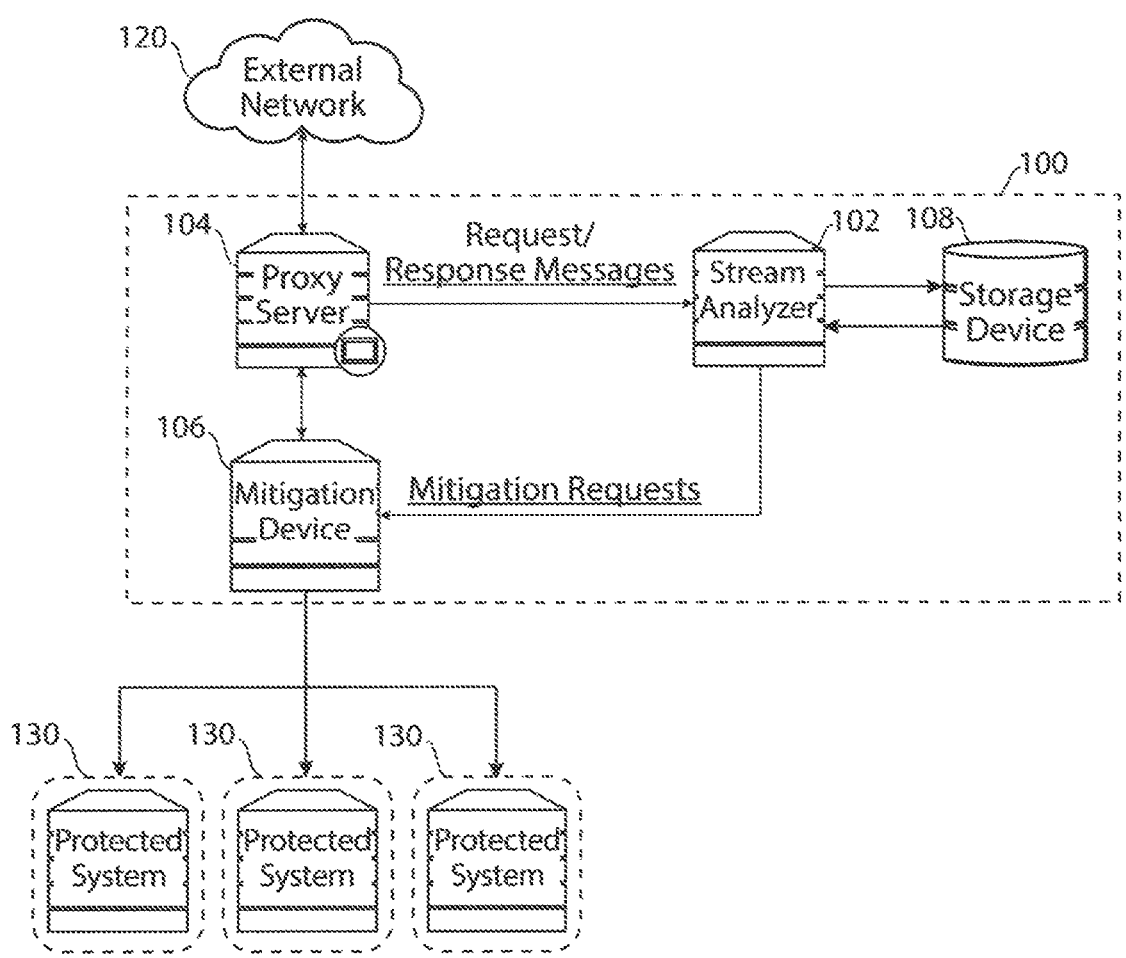
FIG. 1 illustrates a block diagram of an example monitor system in a network environment, in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of a network system in accordance with the disclosure is shown in FIG. 1 and is designated generally by reference character 100. Other embodiments of the network system 100 in accordance with the disclosure, or aspects thereof, are provided in FIGS. 2-4, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, network system 10 includes a monitor system 100 that monitors communication to and from one or more protected systems 130 (referred to individually or collectively as protected system(s) 130). Components of the monitor system 100 include a stream analyzer 102, a proxy server 104, a mitigation device 106, and a storage device 108. These components can communicate with one another in accordance with the methods described below, wherein the communication can be performed using wired and/or wireless communication links.

The communication to/from the protected systems 130 can include requests and responses associated with a network service. The network service can be an external service, including an outgoing protected service provided by the respective protected systems 130 to the external network 120 or an incoming service from the external network 120 used by the protected systems 130. In still another scenario, the network service can be an internal network service used within the protected system 130. Non-limiting examples of incoming or outgoing external network services include internet access, an email service, a social media service, and a search engine. Non-limiting examples of internal network services include a document management service, a docketing service, and a billing management service. The network service to or from a protected system 130 can be compromised when the protected system 130 is under strain, also referred to as network strain. Network strain can be caused by an imbalance in network traffic volume and network resources of the protected system 130 for handling the network traffic. Such strain can be due to problems such as a network attack, a sudden rise in network traffic volume, or a depletion of network resources of the protected system 130, such as due to a malfunction. The effectiveness of the support for network services can be compromised when applied in the same way regardless of whether the network is experiencing network strain.

Monitor system 100 is configured to provide protection to protected systems 130 by using network latency, such as measured by roundtrip delay (RTD) or roundtrip time (RTT), as an indicator of overall health of the protected system 130 receiving and or providing the network service provided by or to the protected system 130. Increases in network latency can provide an early indicator of a distributed denial of service (DDOS) attack. Certain requests for the network service can be identified that are likely to be associated with network strain, even though the requests can be legitimate requests and not part of an attack. The analysis system 102 can notify mitigation device 106 when presence of a DDOS attack or an imbalance between network traffic volume and network resources associated with network strain is indicated. Once notified, mitigation device 106 can apply a mitigation for protecting the protected systems 130 until the DDOS attack or other network strain can be remediated.

The protected systems 130 can each include one or more internally networked internal production systems (not shown). Each of protected systems 130 provides a service. The service can operate by internal production systems of a protected system 130 receiving request messages and replying with response messages. The internal production systems within a protected system 130 can communicate with one another and/or with computing devices outside of the protected system 130 that are networked to an external network 120.

The internal production systems of each of the protected systems 130 can be provided at a single geographic location or can be distributed among multiple geographic locations that can be remote from one another. Examples of protected systems 130 include corporations that have multiple corporate offices, a university that can have multiple buildings and/or campuses, or a home network. Each protected network 130 can include, for example, a local access network (LAN), a wide access network (WAN), and/or a VPN. Examples of internal production systems include servers (e.g., web servers, bank servers, application servers, communication servers, name servers, file servers, etc.), desktop computers, laptop computers, mobile devices, etc.

The external network 120 itself is unprotected by the monitoring system 100. Rather, each protected system 130 is protected from communications received from the external network 120 or from botnets within the protected system 130. The external network 120 can include one or more networks, such as the Internet, an external VPN, etc. The external network 120 can include external hosts, such as servers, desktop computers, laptop computers, smart sensors, mobile device (cell phones, tablets, etc.).

The monitor system 100 can be provided within or at the edge of the protected systems 130, in a public network, and/or can be deployed as a cloud-based server accessible via a network, such as the Internet, a public network, or a private network. The monitor system 100 protects each of the protected systems 130 in accordance with the disclosed method. Accordingly, the service provided by each protected system is referred to as a protected service.

Stream analyzer 102, proxy server 104, and mitigation device 106 each includes a computer system that executes software instructions to perform the method disclosed. Stream analyzer 102, proxy server 104, and mitigation device 106 can share a computer system or certain hardware and/or software components a computer system, or each of stream analyzer 102, proxy server 104, and mitigation device 106 can use separate computer systems. The computer systems(s) used by the each of the stream analyzer 102, proxy server 104, and mitigation device 106 can include a physical machine that is physically near the protected systems 130 and/or the other components of the stream analyzer 102, proxy server 104, and mitigation device 106, or can be a virtual machine in which the programmable instructions are executed by a remote physical computing device. The disclosed system and method can be provided as a stand-alone product or as an added feature to an existing network monitor system that provides protection to a protected system and has access to both request and response messages received by the protected system.

The proxy server 104 acts as a proxy for each of protected systems 130 and sends all request messages to the protected system 130 as well as to the stream analyzer 102 for analysis, and further sends response messages from the protected system 130 to the external network 120 as well as to the stream analyzer 102 for analysis. The analysis by stream analyzer 102 can be performed in real time, such as to recognize indications of a DDOS attack when it is happening.

Storage component 114 communicates by one or more wired or wireless communication links with stream analyzer 102. Storage component 114 includes at least one storage medium for storing the learned clusters and learned histograms received from the stream analyzer 102 Stream analyzer 102 can access the learned clusters and learned histograms during the analysis phase for comparing requests and responses of real time network traffic to the learned clusters and/or learned histograms.

When operating in the learning phase, the stream analyzer 102 observes network behavior when the network system 10 is not under strain and trains a model for the behavior based on observed network latency. The model is an unsupervised machine-learning model that is trained to cluster like requests and generate baseline, learned clusters and learned histograms as indicators of healthy traffic patterns exhibited by the protected service. When operating in the analysis phase, the stream analyzer 102 applies the model to network traffic to monitor the network traffic for network strain.

The learning phase uses the following method during sample operation of the network system 100 when the network system 100 is operating free from DDOS attacks or strain. The stream analyzer 102 receives request and response messages from the proxy server 104. The request and response messages can be logged or streamed messages that include fields, such as example fields shown in Tables 1 and 2. Alternatively, request and response messages received during the learning and analysis phases can further include optional fields, as shown in Table 3 (wherein Table 3 shows the fields as normalized).

TABLE 1

Request Fields

| Field | Description |
| --- | --- |
| UID | Unique Identifier (SHA-1) |
| Timestamp | Unix Timestamp |
| Destination IP | IP Address |
| HTTP Method | GET, PUT, PATCH, etc. |
| HTTP URL | Uniform Resource Locator |
| HTTP Body Size | Non-Negative Integer |

TABLE 2

Response Fields

| Field | Description |
| --- | --- |
| UID | Unique Identifier (SHA-1) |
| Round-Trip Delay (RTD) | Positive Integer |
| HTTP Status | 200, 404, 500, etc. |
| HTTP Size | Non-Negative Integer |
| HTTP Type | MIME Type |

TABLE 3

Optional Fields

| Field | Normalization Method |
| --- | --- |
| RTD | RTD/max RTD |
| HTTP Status | avg code RTD/max RTD |
| HTTP Size | size/max HTTP size |
| HTTP Type | avg type RTD/max RTD |

Stream analyzer 102 normalizes each of the fields in the messages, such as in accordance with the example normalization equations shown in Table 4.

TABLE 4

Normalized Fields

| Field | Normalization Method |
| --- | --- |
| Destination IP | (ping ms + # hops ^ 2)/max |
| HTTP Method | avg method RTD/max RTD |
| HTTP URL | avg path RTD/max RTD |
| HTTP Body Size | body size/max RTD |

The learning phase is performed in iterations, each iteration corresponding to a selected time interval (e.g., without limitation, one hour). Received request and response messages are buffered for the time interval, after which they are processed together, allowing for a sufficiently large number of events (request and message pairs) to be processed at the same time. In the example shown, destination IP is normalized by a term max, which refers to the maximum value determined for the equation (ping ms+#hops^2) for the particular destination IP address. This term max can be updated as additional network traffic is received during the learning phase over a large number of intervals.

HTTP method, uniform resource locator (URL), and body size are each normalized over a term maximum return time delay (max RTD). Max RTD can be determined manually or calculated during each iteration of the learning phase based on the maximum RTD of network traffic received during the iteration. Max RTD can further be adjusted by adding a configurable amount of headroom. While both request messages and response messages are normalized using the same max RTD, max RTD is calculated based on the maximum return time value associated with the response messages. Max RTD can be updated as network traffic is received during the learning phase, over a large number of intervals. Network traffic acquired over a large number of intervals is used since Max RTD is effectively determined once a sufficiently large number of response messages have been received.

The stream analyzer 102 clusters the request messages using an unsupervised algorithm, such as KMeans, DBSCAN, Self Organizing Map (SOM), etc. Once clustered, the response messages in each cluster are used to score the cluster based on a network delay associated with the response, e.g., RTD. The score is determined using statistical functions such as, and without limitation, maximum, median, mean, standard deviation (SD), median absolute deviation (MAD), percentiles, etc. These scores are added to learned cluster-specific histograms for each statistical function used. For example, each cluster can have multiple histograms, such as a maximum histogram, a median histogram, an SD histogram, a MAD histogram, and a percentiles histogram. The learned histograms are used to measure the behavior of each of the clusters with regard to their RTD over time when operating under normal conditions without threat of an attack.

The learning phase can include multiple iterations. Iterations can be repeated at selected short time intervals, such as one-minute intervals. Each iteration can be performed using a streaming time window that has a longer time interval, such as a one-hour interval. In this example, a new one-hour interval would be processed for updating the histograms every minute. The disclosure is not limited to a particular short or longer time interval.

During the analysis phase, network delays associated with real time operation of the protected service are analyzed to determine when the protected service is coming under strain and at risk of going offline. Statistical functions being tracked and analysis histograms for the respective statistical functions are updated in real time at regular short time intervals for the RTDs determined for each short time interval. The short time interval can be, for example and without limitation, one minute. The analysis histograms are compared to the learned histograms determined during the learning phase, which provides a comparison of network-delay behavior of the network in real time relative to the behavior of the network during the learning phase.

Additionally, during the analysis phase, the learned clusters and learned histograms can be updated to accommodate changes that could affect network delay during healthy operation. When strain and/or risk of going offline is detected for any of the protected systems 130, the stream analyzer 102 can notify the mitigation device 106.

The analysis phase uses the following method during actual operation of the network system 100 to detect conditions that indicate the presence of a DDOS attack or other strain on the network system 100. The stream analyzer 102 monitors actual operation of the protected systems 130 by receiving request and response messages from the proxy server 104 during actual operation. These messages can be logged or streamed in real time by the proxy server 104. The request and response messages can include fields, such as example fields shown in Tables 1 and 2, and can further optionally include the example fields shown in Table 3. The stream analyzer 102 places each request message in a queue to ensure that a response message is received for each request message. When a request message is held in the queue beyond a timeout interval, a simulated response message is generated by the stream analyzer 102. The stream analyzer normalizes each of the response messages and simulated response messages, such as by applying the example equations shown in Table 4, which can include using max RTD and max that were determined for the learning phase.

The stream analyzer 102 classifies the normalized response and simulated response messages into analysis clusters in order to group like requests/response message pairs using the learned clusters from the learning phase, such as by applying a k-nearest neighbor algorithm. The analysis clusters are scored based on network delay metrics, e.g., RTDs, associated with the analysis clusters.

Using the scores, the RTDs for the analysis clusters are reduced to analysis histograms. The analysis histograms are a measure of behavior of the respective analysis clusters with regard to their RTD over time while operating in real time. The analysis histograms are compared with the corresponding learned histograms for indicator conditions of over-subscription. Indicators of over-subscription can include, for example, (a) the mean RTD is equal to the timeout interval, (b) the minimum or mean RTD for a time window is greater than a predetermined (e.g., 90th or 99th) percentile of the corresponding learned histogram, etc. A confidence level that oversubscription is occurring increases as more indicator conditions are detected. When a sufficient confidence level is reached, a strain event is logged, alerts are generated, and a mitigation request is sent to mitigation device 106.

In embodiments, the histograms can have keys that identify an associated destination IP address. The mitigation request can be specific to a destination IP address based on the destination IP address keyed to a histogram that satisfies any of the indicator conditions.

The mitigation device 106 receives notifications when the stream analyzer 102 has detected strain and/or risk of going offline for any of the protected systems 130 and can take an appropriate action.

Figure 2:
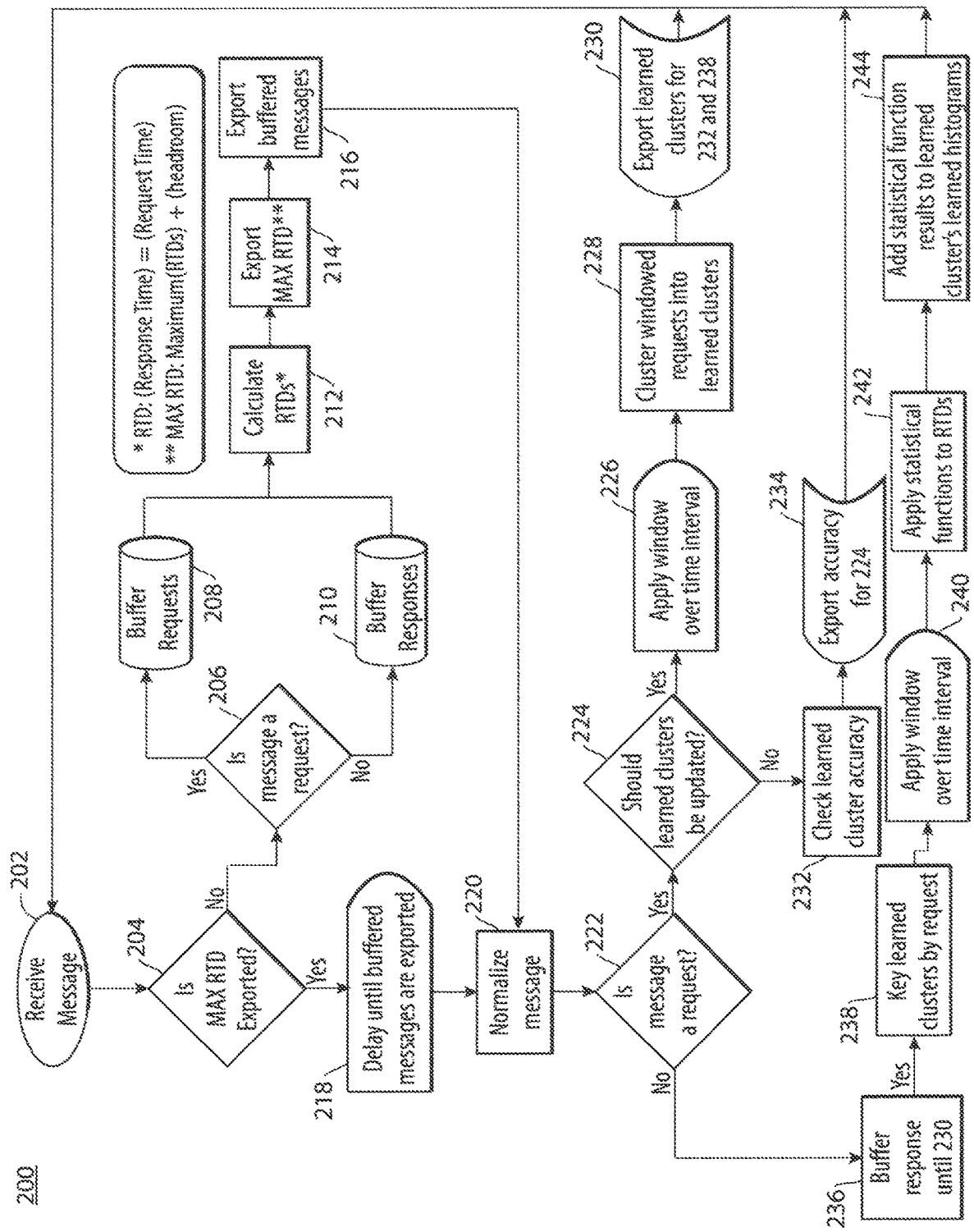
FIG. 2 illustrates a flowchart showing an example method performed by a stream analyzer of the monitor system during a learning phase, in accordance with embodiments of the disclosure.
Figure 3:
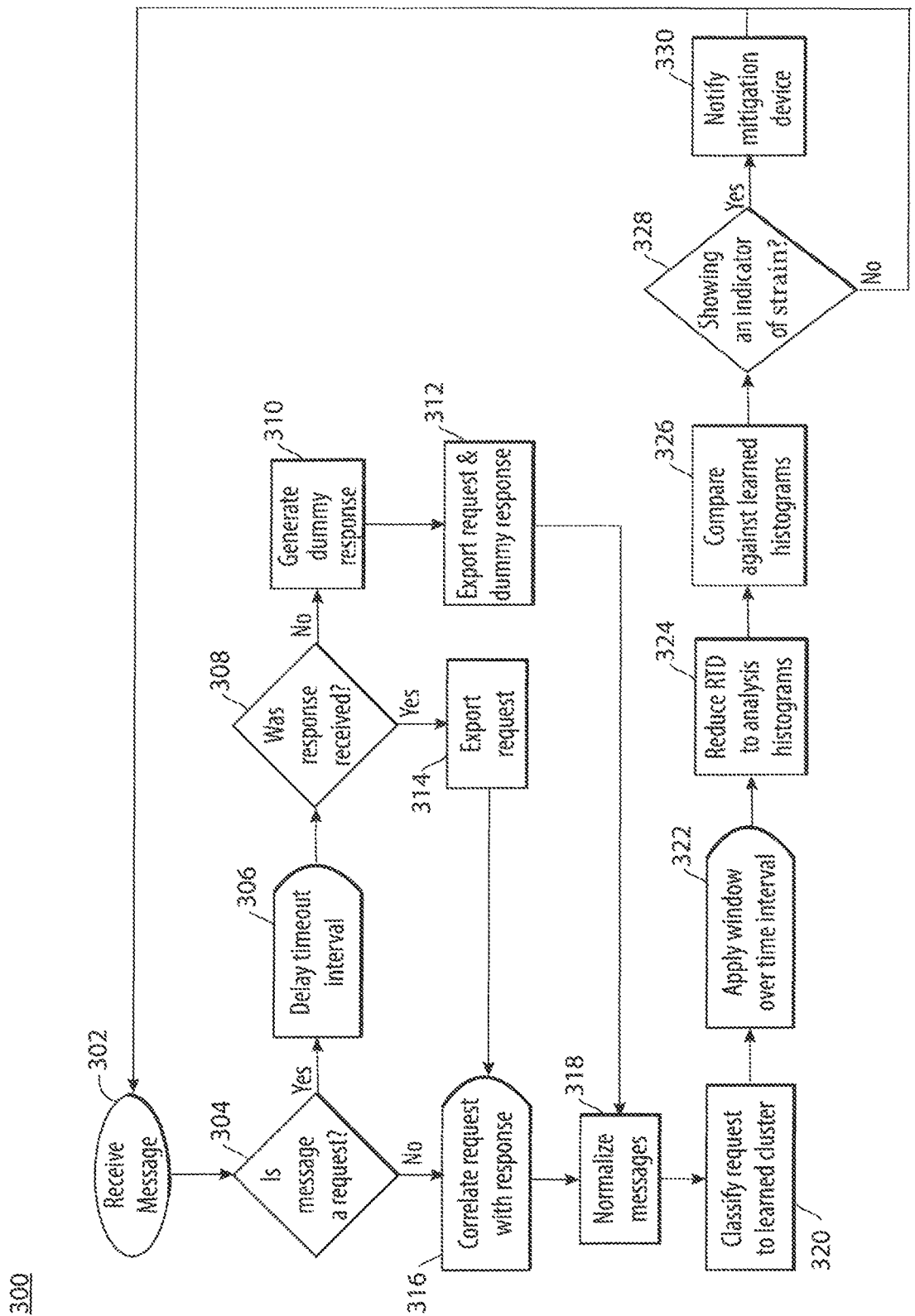
FIG. 3 illustrates a flowchart showing an example method performed by the stream analyzer during an analysis phase, in accordance with embodiments of the disclosure.

With reference now to FIGS. 2 and 3, shown are flowcharts demonstrating example implementation of the various exemplary embodiments. It is noted that the order of blocks shown in FIGS. 2 and 3 is not required, so in principle, the various blocks may be performed out of the illustrated order or in parallel. Also certain blocks may be skipped, different blocks may be added or substituted, or selected blocks or groups of blocks may be performed in a separate application following the embodiments described herein.

FIG. 2 illustrates a flowchart 200 that shows an example method performed by a stream analyzer during a learning phase for developing a learned model, such as stream analyzer 102 shown in FIG. 1. The learning phase trains an unsupervised machine learning model to cluster like request messages and generate a representation of baseline behavior of traffic patterns of the a protected system, such as protected systems 130 shown in FIG. 1. At block 202, a message of learning network traffic is received, e.g., via a proxy server, such as proxy server 104 shown in FIG. 1. The message can be received in real time, or from a log of messages, as the network is in operation in the learning phase is a safe environment in which the network system is not exposed to attacks.

At block 204, a determination is made whether Max RTD has been exported for the current interval. If the determination at block 204 is NO, meaning Max RTD has not been exported yet, the method continues at block 206, else if the determination at block 204 is YES, meaning Max RTD has already been exported, the method continues at block 218.

At block 206, a determination is made whether the message is a request. If the determination at block 206 is YES, meaning the message is a request, the method continues at block 208, else if the determination at block 206 is NO, meaning the message is not a request, the method continues at block 210. At block 208, the message is buffered with requests and the method continues at block 212. At block 210, the message is buffered with responses and the method continues at block 212. At block 212, RTDs are calculated for each of the request response pairs based on Equation (1) below:

$$\text{RTD} = \text{Response Time} - \text{Request Time} \quad \text{Equation (1)}$$

At block 214, Max RTD is updated if appropriate based on Equation (2) below, and the updated Max RTD is exported.

$$\text{Max RTD} = \text{Maximum(RTDs)} + (15\% \text{ headroom}) \quad \text{Equation (2)}$$

The method continues at block 216. At block 216, the buffered messages are exported and the method continues at block 220. At block 218, the method delays by waiting a period of time sufficient for the buffered messages to be exported at block 216.

The method continues at block 220. At block 220, the message received at block 202 is normalized, such as using normalization methods shown in Tables 3 and 4. At block 222 a determination is made whether the message received at block 202 is a request. If the determination at block 222 is YES, meaning the message is a request, the method continues at block 224, else if the determination at block 222 is NO, meaning the message is not a request, the method continues at block 236.

At block 224, a determination is made whether clusters of the model should be updated. If the determination at block 224 is YES, meaning the clusters should be updated, the method continues at block 226, else if the determination at block 224 is NO, meaning the clusters do not need to be updated, the method continues at block 232.

At block 226, a window is applied over a time interval. At block 228, the request messages within the window (referred to as windowed requests) are clustered into learned clusters. Clustering is performed based on the normalized values associated with the fields of the request messages, such as using an unsupervised algorithm, e.g., KMeans, DBSCAN, Self Organizing Map (SOM), etc. At block 230, the learned clusters are exported for use by blocks 232 and 238. The method continues at block 202 to wait for arrival of a next message.

At block 232, the learned clusters are checked for accuracy. At block 234, the accuracy determined at block 232 is exported to block 224 to be used for making its determination. The method continues at block 202 to wait for arrival of a next message.

At block 236, the response received at block 202 is buffered with a delay sufficient for block 230 to be performed. This response is buffered until the request messages can be used to export the clusters at block 230. At block 238, the learned clusters are keyed by request, meaning the response messages are correlated with the learned clusters to which their corresponding responses have been clustered. At block 240, a window is applied over a time interval, with the window ending at the moment the method proceeds from block 240 to 242. At block 242, statistical functions are applied for the window applied to the RTDs for the responses associated with each learned cluster. A result of the statistical function for each learned cluster is used to assign a score to the learned cluster. At block, 244 the scores determined at block 242 are added to learned histograms for each learned cluster to update each learned histogram based on revisions to the learned clusters and the RTDs for each learned cluster over the window applied. The method continues at block 202 to wait for arrival of a next message.

In one or more embodiments, instead of using blocks 204, 206, 208, 210, 212, and/or 214 to determine Max RTD, Max RTD can be determined and/or configured manually.

FIG. 3 illustrates a flowchart 300 that shows an example method performed by a stream analyzer during an analysis phase, such as stream analyzer 102 shown in FIG. 1. During the analysis phase, using a model based on the learned clusters and learned histograms developed during the learning phase, a determination can be made when a network system is under strain and at risk of going offline based on trends of the network traffic. Additionally, the model can be updated as behaviors of the protected system evolve. At block 302, a message of network traffic is received, e.g., via a proxy server, such as proxy server 104 shown in FIG. 1. The message can be received in real time, or from a log of messages, as the network is in operation in its operating environment, which can include exposure to attacks.

At block 304, a determination is made whether the message is a request. If the determination at block 304 is YES, meaning the message is a request, the method continues at block 306, else if the determination at block 304 is NO, meaning the message is not a request message, the method continues at block 312. At block 306, the method delays by waiting a timeout interval, wherein the timeout interval is a sufficient amount of time for a response message to the request message to be received. At block 308, a determination is made whether the response has been received. If the determination at block 308 is NO, meaning the response message has not been received, the method continues at block 310. At block 310, a dummy response message is generated. The dummy response message represents a response message that was not actually received, but is simulated as having been received after the delay period. At block 312, the request message received at block 302 and the generated dummy response message are exported for normalization at block 318.

If the determination at block 308 is YES, meaning the response message has been received, the method continues at block 314. At block 314, the request message is exported. At block 316, the request message received at block 302 is correlated with the response message determined to have been received at block 308.

At block 318 the request and response messages exported at block 312 or the request exported at block 314 and its corresponding response message are normalized, such as using normalization methods shown in Tables 3 and 4. At block 320, the normalize request message is classified to a learned clusters. The classification can compare normalized fields of the request message to normalized fields of request messages in the learned clusters, using for example a k-nearest neighbor algorithm to select a learned cluster.

At block 322, a window is applied over a time interval. At block 316, the RTDs for each analysis cluster is reduced to an analysis histogram. At block 324, At block 326, the analysis histogram is compared to the learned histogram. At block 328, a determination is made, based on the comparison, whether there is an indication of strain, such as could be caused by a denial-of-service attack based on a result of the comparison. For example, the comparison can seek indicators of oversubscription. Indicators of oversubscription can include, for example, a mean RTD for the window being equal to the timeout interval applied at block 306 or a minimum or mean RTD for the window being greater than a predetermined threshold percentile, for example, a threshold percentile of 99.9. At block 328, a confidence value can be increased as the number of indicators that are met increase.

If it is determined at block 328 that NO, there is no indication of strain (e.g., the confidence value has not reached a threshold value), the method continues at block 302 to wait for arrival of a next message. If it is determined at block 328 that YES, there is an indication of strain (e.g., the confidence value has reached a threshold value), the method continues at block 302 to wait for arrival of a next message. At block 330, a signal is sent to a mitigation device, such as mitigation device 106 shown in FIG. 1, to begin a mitigation action. Mitigation actions can include scrubbing traffic or requesting cloud signaling for the protected host 130 shown in FIG. 1. Additionally, information is logged about a detected event, such as the host experience strain 130 shown in FIG. 1 and the difference between the learned indicators and those exhibited by the event, additionally an alert can be generated to a human administrator and/or to other processing devices.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments performed by the monitor system 100 may be implemented or executed by one or more computer systems. For example, processing performed by stream analyzer 102, a proxy server 104, a mitigation device 106, can be implemented using one or more computer systems, such as example computer system 402 illustrated in FIG. 4. In various embodiments, computer system 402 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 402 is only one example of a suitable system and is not intended to suggest any limitation as to the scope of use or functionality of embodiments of the disclosure described herein. Regardless, computer system 402 is capable of being implemented and/or performing any of the functionality set forth hereinabove.

Computer system 402 may be described in the general context of computer system-executable instructions, such as program modules, being executed by a computer system. Generally, program modules may include routines, programs, objects, components, logic, data structures, and so on that perform particular tasks or implement particular abstract data types. Computer system 402 may be practiced in distributed data processing environments where tasks are performed by remote processing devices that are linked through a communications network. In a distributed data processing environment, program modules may be located in both local and remote computer system storage media including memory storage devices.

Figure 4:
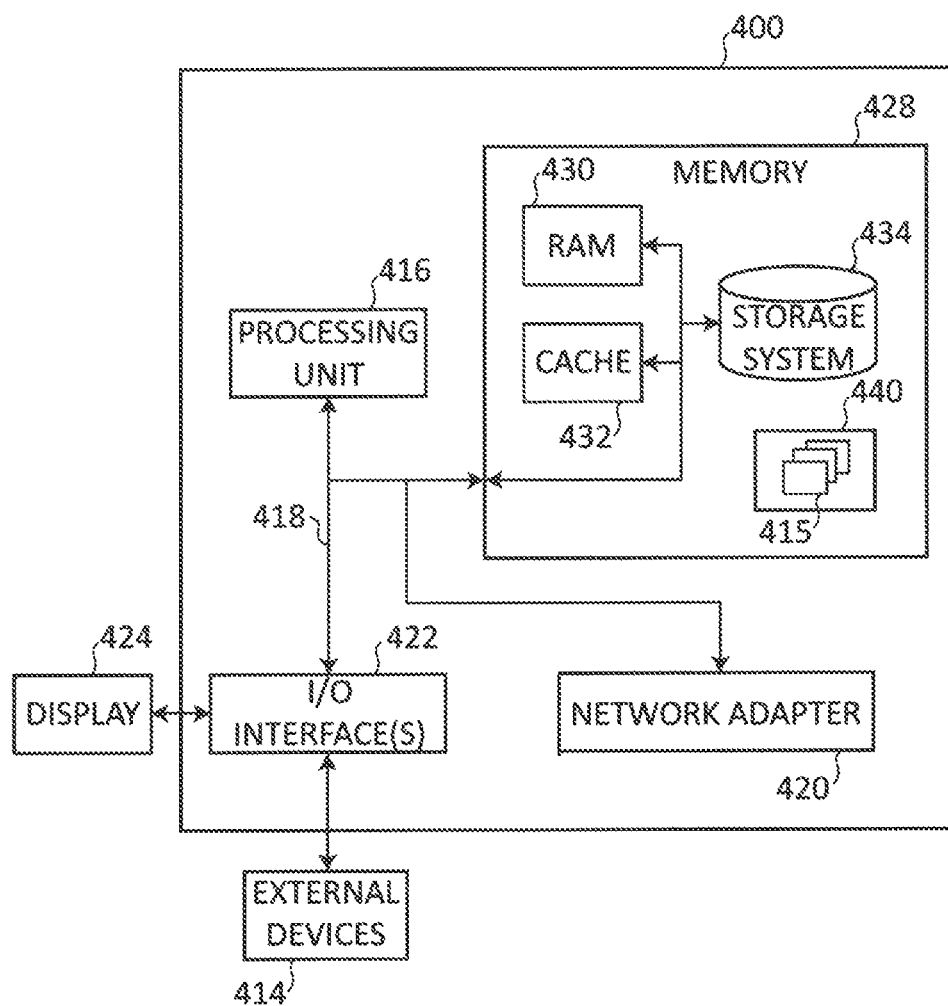
FIG. 4 illustrates a schematic block diagram of an example computer system used by the monitor system, in accordance with an illustrative embodiment of the present disclosure.

Computer system 402 is shown in FIG. 4 in the form of a general-purpose computing device. The components of computer system 402 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 402 typically includes a variety of computer system readable media. Such media may be any available media that is accessible by components of the monitor system 100, and it includes both volatile and non-volatile media, removable and non-removable media.

System memory 428 can include computer system readable media in the form of volatile memory, such as random access memory (RAM) 430 and/or cache memory 432. Computer system 402 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the disclosure.

Program/utility 440, having a set (at least one) of program modules 415 may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 415 generally carry out the functions and/or methodologies of embodiments of the disclosure as described herein.

Computer system 402 may also communicate with one or more external devices 414 such as a keyboard, a pointing device, a display 424, etc.; one or more devices that enable a user to interact with computer system 402; and/or any devices (e.g., network card, modem, etc.) that enable components of the monitor system 100 to communicate with one or more other computing devices. Such communication can occur via Input/Output (I/O) interfaces 422. Still yet, computer system 402 can communicate with one or more networks such as a local area network (LAN), a general wide area network (WAN), and/or a public network (e.g., the Internet) via network adapter 420. As depicted, network adapter 420 communicates with the other components of the monitor system 100 via bus 418. It should be understood that although not shown, other hardware and/or software components could be used in conjunction with computer system 402. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed method and system includes the ability to detect strain on a protected network regardless of the cause, and request mitigation in a timely fashion while the protected network is still operational. In this way, the protected network can continue to be operational while the mitigation is applied, even with degraded functionality.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed:
1. A method of monitoring a protected network for strain, the method comprising:
in an analysis phase during operation of the protected network:
receiving a learned model having clusters of learning requests of learning network traffic observed during non-strain operation of the protected network, each cluster having an associated characteristic learning response time based on learning response times determined for learning requests and corresponding learning responses of the learning network traffic;
observing network traffic having traffic requests and traffic responses to and from the protected network;

classifying each of the traffic requests with one of the clusters by comparing fields of the traffic request to fields used for clustering the learning requests with the clusters;

associating one of the traffic responses or lack of traffic response to each corresponding traffic request of the clusters;

determining an analysis response time for the respective traffic responses;

associating the analysis response time with the respective classified traffic requests that correspond to the traffic responses;

determining an analysis response time characteristic per cluster based on the analysis response time associated with the respective classified traffic requests classified with the cluster;

determining a difference per cluster between the analysis response time and the learning response time associated with the cluster; and notifying a mitigation device when the difference determined for enough of the clusters exceeds a predetermined threshold.

2. The method of claim 1, further comprising:
in a learning phase during non-strain operation of the protected network:
observing the learning network traffic;
clustering the learning requests based on the respective learning requests' fields;
associating one of the learning responses or lack of learning response to each corresponding learning request of the clusters;
determining the learning response time for the respective learning responses; and
determining the characteristic learning response time per cluster based on the learning response times of the learning responses that correspond to the learning requests associated with the cluster.

3. The method of claim 2, further comprising normalizing selected fields of each learning request before clustering the learning requests using the normalized selected fields.

4. The method of claim 3, further comprising determining a maximum return time, wherein the selected fields of the learning requests and traffic requests are normalized using the maximum return time.

5. The method of claim 4, further comprising normalizing the selected fields of each traffic request, wherein normalizing the selected fields of the traffic requests is performed before classifying the traffic requests.

6. The method of claim 2, further comprising buffering the observed learning requests for a time interval before clustering the learning requests that were buffered for the time interval.

7. The method of claim 2, further comprising generating a learned histogram per cluster that represents behavior of the cluster with regard to learning response times over time.

8. The method of claim 7, further comprising generating an analysis histogram per cluster that represents behavior of response times associated with traffic responses that correspond to traffic requests classified with the cluster over a window of time, wherein determining the difference per cluster includes comparing the learned histogram and the analysis histogram associated with the respective clusters.

9. The method of claim 1, further comprising buffering the observed traffic requests for a time interval before classifying the traffic requests that were buffered for the time interval.

10. The method of claim 1, further comprising, wherein for each traffic request that does not have a paired traffic response, generating a timed-out response with an assigned learned response time and associating the timed-out response to the traffic response, the assigned learned response time being larger than a predetermined acceptable response time window between receiving a traffic request and a corresponding traffic response.

11. A network monitoring system to monitor a protected network for strain, the network monitoring system comprising:
a memory configured to store instructions; and
a processor disposed in communication with the memory, wherein the processor, upon execution of the instructions is configured to:
in an analysis phase during operation of the protected network:
receive a learned model having clusters of learning requests of learning network traffic observed during non-strain operation of the protected network, each cluster having an associated characteristic learning response time based on learning response times determined for learning requests and corresponding learning responses of the learning network traffic;
observe network traffic having traffic requests and traffic responses to and from the protected network;
classify each of the traffic requests with one of the clusters by comparing fields of the traffic request to fields used for clustering the learning requests with the clusters;
associate one of the traffic responses or lack of traffic response to each corresponding traffic request of the clusters;
determine an analysis response time for the respective traffic responses;
associate the analysis response time with the respective classified traffic requests that correspond to the traffic responses;
determine an analysis response time for the respective traffic responses;
determine a difference per cluster between the analysis response time and the learning response time associated with the cluster; and
notify a mitigation device when the difference determined for enough of the clusters exceeds a predetermined threshold.

12. The network monitoring system of claim 11, wherein the processor, upon execution of the instructions is further configured to:
in a learning phase during non-strain operation of the protected network:
observe the learning network traffic;
cluster the learning requests based on the respective learning requests' fields;
associate one of the learning responses or lack of learning response to each corresponding learning request of the clusters;
determine the learning response time for the respective learning responses; and
determine the characteristic learning response time per cluster based on the learning response times of the learning responses that correspond to the learning requests associated with the cluster.

13. The network monitoring system of claim 12, wherein the processor, upon execution of the instructions is further configured to normalize selected fields of each learning request before clustering the learning requests using the normalized selected fields.

14. The network monitoring system of claim 13, wherein the processor, upon execution of the instructions is further configured to determine a maximum return time, wherein the selected fields of the learning requests and traffic requests are normalized using the maximum return time.

15. The network monitoring system of claim 14, wherein the processor, upon execution of the instructions is further configured to normalize the selected fields of each traffic request, wherein normalizing the selected fields of the traffic requests is performed before classifying the traffic requests.

16. The network monitoring system of claim 12, wherein the processor, upon execution of the instructions is further configured to buffer the observed learning requests for a time interval before clustering the learning requests that were buffered for the time interval.

17. The network monitoring system of claim 12, further comprising generating a learned histogram per cluster that represents behavior of the cluster with regard to learning response times over time.

18. The network monitoring system of claim 17, further comprising generating an analysis histogram per cluster that represents behavior of response times associated with traffic responses that correspond to traffic requests classified with the cluster over a window of time, wherein determining the difference per cluster includes comparing the learned histogram and the analysis histogram associated with the respective clusters.

19. The network monitoring system of claim 11, wherein the processor, upon execution of the instructions is further configured to buffer the observed traffic requests for a time interval before classifying the traffic requests that were buffered for the time interval.

20. The network monitoring system of claim 11, wherein the processor, upon execution of the instructions is further configured to:
   for each traffic request that does not have a paired traffic response, generate a timed-out response with an assigned learned response time; and
   associate the timed-out response to the traffic response, the assigned learned response time being larger than a predetermined acceptable response time window between receiving a traffic request and a corresponding traffic response.

* * * * *